United States Patent Office 2,717,210
Patented Sept. 6, 1955

2,717,210

METHOD OF OBTAINING CONCENTRATES OF CAROTENE

Marinus Cornelis de Witte, Zwyndrecht, Netherlands

No Drawing. Application August 30, 1952,
Serial No. 307,397

4 Claims. (Cl. 99—11)

In various edible oils, carotenoids are present. For instance, the red color of palm oil is caused by these substances. In spite of the fact that palm oil contains at most 1 pro mille carotene, it is strongly colored.

It is of importance to separate or strongly concentrate the carotenoids from edible oils, specifically from palm oil, as these carotenoids may be used as natural coloring for margarine instead of the usual azo colorings, which are suspected of carcinogenic properties. When margarine is colored with a carotenoid, it requires less addition of vitamin A, as the carotenoids are pro-vitamin A active.

So far carotenoids or their concentrates have been prepared by two principally different methods, i. e., chemical and physical methods.

The chemical methods are based on the nonsaponifiable character of carotene. The oil is saponified with caustic. The water and the greater part of the formed glycerol is removed by vacuum distillation, and a dry powder (the soap) is obtained, which contains the pigment. The latter is extracted from the soap with a suitable solvent, for instance petroleum ether (U. S. Patent No. 2,440,029).

The U. S. Patent No. 2,460,796 concerns also a chemical method. By this method the glycerides are converted into the corresponding ethylesters, by treatment with ethyl alcohol, using sodium ethylate as a catalyst. The ethylesters and the glycerol are removed by vacuum distillation at a pressure of 0.02–0.5 mm. mercury.

The residue contains the wanted carotenoids. An example of the physical methods for the preparation of carotene concentrates is the U. S. Patent No. 2,432,021 according to which palm oil is selectively extracted with liquid propane at a temperature of 80° to 90° C. The pressure used is approximately 50 atmospheres.

The chemical procedures have extremely large disadvantages: Because of the very low content of carotene in the treated oil, it is necessary to saponify extremely large quantities of oil in order to separate any appreciable amounts of carotene. The oil is changed into a soap, whereby the product loses value since the oil itself is an edible oil much more valuable than the soap derived from it. The method is not very well suited for application on a technical scale, as the high vacuum is technically not very desirable.

It is clear, therefore, that a method of gaining carotene without chemically attacking the oil is of great importance. The physical method known to date makes this possible, but it has the disadvantage of furnishing only concentrates, in contrast to the chemical methods which can give crystalline carotene. Moreover, the amount of concentration is very small (only twice the original concentration according to the example given in the patent), and the carotene recovery is also small. The propane method requires an elaborate and expensive processing unit. In practice the method can be used only when associated with a propane refining plant for edible or mineral oils.

The applicant has discovered that carotene concentrates can be obtained by a method which permits recovery of approximately 90 per cent of the original oil after removal of practically all of its carotene. The remaining fraction has a carotene concentration of approximately ten times the original.

Such concentrate may in many cases be used directly or may be reworked to a very strong concentrate or even crystalline carotene by one of the known chemical methods.

The application of the chemical methods to the concentrates obtained according to this conception is very feasible and has fewer disadvantages, as the quantity of oil that has to be worked upon is only one-tenth of the original quantity. No longer is all the oil changed into less valuable products, but only 10 percent of it.

According to this invention carotene concentrates are obtained by solution of an edible oil in a hydrocarbon solvent, crystallization of the solution by cooling, filtering of the crystals which have been formed, and removing the solvent from the filtrate. Especially the lower hydrocarbons are suitable solvents, for instance propane, butane, pentane, hexane, petroleum ether, gasoline, etc.

The amount of solvent may be varied within wide limits; preferably 3 to 5 volume parts of solvent are used per one volume part of oil.

Preferably, the solution is crystallized in a continuous crystallizer. The cooling is at first done rapidly, e. g., at a rate of 5° C. per minute, until a temperature of approximately 10° C. is reached and thereupon slowly, at a rate of 0.5–1.5° C. per minute until an end temperature of —25° to —30° C. is reached.

The filtration of the crystals is done at a temperature of approximately —25° to —30° C. in a continuous filter. A rotating filter may be used for this. The crystals are rewashed with cold solvent. A very suitable type of filter is the Dorr Oliver drum filter with string discharge. The cooling can be done directly but also indirectly by using a common ammonia-, sulfur-dioxide-, or Freon-refrigerator.

When use is made of propane, butane, or another solvent of similar volatility, the required cooling can be achieved by evaporation of a part of the solvent.

Normally the filtering does not cause any difficulties. If necessary, one can make use of a filter aid, for instance by adding 10 or 15 per cent of such agent to the oil.

The removal of the solvent from the crystal aggregate, that is, from the practically carotene free oil, and from the filtrate (the carotene concentrate), is done by evaporation followed by stripping with steam or inert gases. In this way the solvent may be reclaimed continuously. In order not to decompose the carotene, the temperature of the carotene concentrate should not exceed 70° C. It may therefore be necessary to remove the solvent at a pressure lower than atmospheric.

Example

One volume part of Congo palm oil with a carotene content of 0.4 mg./g. was dissolved in 4 volume parts of petroleum-ether (boiling point 40–60° C.) and by cooling caused to crystallize in a small crystallizer, which was cooled with circulating brine (which in turn was cooled by a Freon refrigerator) and which was equipped with a slowly rotating stirrer (30 R. P. M.).

The palm oil was added to the solvent as a liquid, that is, at a temperature above 35° C.

At first, cooling was carried out at a rate of 5° C. per minute until a temperature of 10° C. was reached. Thereupon cooling was done slowly, at a rate of 0.5–1.5° C. per minute until the final temperature of —25° C. was reached.

The crystal aggregate obtained by the cooling was removed by filtration in a double walled Buchner funnel which had also been pre-cooled to —25° C. and was rewashed with petroleum ether of —25° C. A greenish white crystal aggregate was obtained.

The solvent was removed from the crystal aggregate as well as from the filtrate by distillation and stripping with $CO_2$ under vacuum (end vacuum 6–10 cm. mercury).

Starting with 100 g. of palm oil, 9.2 g. of a very clear red concentrate was obtained which contained 36 mg. of carotene, which means 3.9 mg. per g. The procedure has, therefore, increased the concentration by a factor of ten.

The color of the reclaimed oil which can be used as normal edible oil was light greenish yellow.

I claim:

1. In a method of obtaining carotene concentrates from edible oils by dissolving the edible oil in a hydrocarbon solvent and crystallizing the solution by cooling, the improvement which comprises extracting substantially all of the carotene content by mixing the oil and a hydrocarbon solvent having volatility permitting separation at a temperature subjecting the carotene to not exceeding 70° C., cooling the oil and solvent mixture rapidly at a rate of 5° C. per minute until a temperature of about 10° C. is reached, then cooling slowly a a rate of 0.5–1.5° C. per minute until —25° C. is reached, filtering off the solids and removing the solvent from the filtrate.

2. A method according to claim 1, characterized by affecting the cooling by letting part of the solvent evaporate.

3. A method according to claim 1, characterized by adding 3–5 volume parts of solvent to 1 volume part of edible oil.

4. A method according to claim 1, characterized by the fact that palm oil is the starting material.

References Cited in the file of this patent

UNITED STATES PATENTS

| | | |
|---|---|---|
| 1,988,031 | Barnett | Jan. 15, 1935 |
| 2,032,165 | Barnett | Feb. 25, 1936 |
| 2,131,394 | Test | Sept. 27, 1938 |
| 2,318,747 | Buxon | May 11, 1943 |